United States Patent
Terashita

(10) Patent No.: US 7,515,181 B2
(45) Date of Patent: Apr. 7, 2009

(54) METHOD, APPARATUS, AND PROGRAM FOR IMAGE PROCESSING ON IMAGE DATA THAT HAVE ALREADY BEEN SUBJECTED TO IMAGE PROCESSING

(75) Inventor: Takaaki Terashita, Kaisei-machi (JP)

(73) Assignee: FUJIFILM Corporation, Tokyo (JP)

(*) Notice: Subject to any disclaimer, the term of this patent is extended or adjusted under 35 U.S.C. 154(b) by 601 days.

(21) Appl. No.: 10/367,942

(22) Filed: Feb. 19, 2003

(65) Prior Publication Data

US 2003/0197879 A1 Oct. 23, 2003

(30) Foreign Application Priority Data

Feb. 19, 2002 (JP) ............... 2002-041342

(51) Int. Cl.
   H04N 5/76 (2006.01)
   G06K 15/00 (2006.01)
   H04N 1/40 (2006.01)
(52) U.S. Cl. .............. 348/231.6; 348/231.3; 348/207.2; 348/333.02; 358/2.1
(58) Field of Classification Search ... 348/231.1–231.9, 348/223.1, 229.1
   See application file for complete search history.

(56) References Cited

U.S. PATENT DOCUMENTS

| 4,574,319 | A  |   | 3/1986  | Konishi |          |
|-----------|----|---|---------|---------|----------|
| 6,011,546 | A  |   | 1/2000  | Bertram |          |
| 6,011,547 | A  |   | 1/2000  | Shiota et al. |    |
| 6,078,686 | A  | * | 6/2000  | Kim ............................ 382/167 |
| 6,154,288 | A  | * | 11/2000 | Watanabe ..................... 358/1.9 |
| 6,273,535 | B1 |   | 8/2001  | Inoue et al. |       |
| 6,373,533 | B1 | * | 4/2002  | Kawabata et al. ........... 348/672 |
| 6,650,365 | B1 | * | 11/2003 | Sato ......................... 348/231.3 |
| 6,919,924 | B1 | * | 7/2005  | Terashita ................. 348/223.1 |
| 7,355,754 | B2 | * | 4/2008  | Terashita ..................... 358/2.1 |
| 7,359,571 | B2 | * | 4/2008  | Terashita .................... 382/274 |
| 2001/0035909 | A1 | * | 11/2001 | Kubo ......................... 348/232 |
| 2002/0027603 | A1 | * | 3/2002  | Kuwata et al. .............. 348/232 |
| 2002/0034336 | A1 | * | 3/2002  | Shiota et al. ................ 382/274 |
| 2003/0179300 | A1 | * | 9/2003  | Terashita ................. 348/231.3 |

FOREIGN PATENT DOCUMENTS

EP 0 838 939 A2 4/1998

* cited by examiner

Primary Examiner—Ngoc-Yen T Vu
Assistant Examiner—Kelly L Jerabek
(74) Attorney, Agent, or Firm—Birch, Stewart, Kolasch & Birch, LLP

(57) ABSTRACT

Image processing reflecting image processing that was carried out on image data is carried out on the image data. Image data sets S1 obtained by a digital camera 1 have been subjected to image processing and image processing information G representing the type of image processing is added to the image data sets S1. In an image output apparatus 2, setting means 24 sets the content of image processing to be carried out on the image data sets S1 according to the image processing information G added thereto. For example, if the image processing information G indicates tone processing, the image processing is set so as not to carry out tone processing. Output image processing means 22 carries out the image processing on the image data sets S1 according to the content, and print output means 25 prints processed image data sets S2 as prints P.

22 Claims, 7 Drawing Sheets

METHOD, APPARATUS, AND PROGRAM FOR IMAGE PROCESSING ON IMAGE DATA THAT HAVE ALREADY BEEN SUBJECTED TO IMAGE PROCESSING

BACKGROUND OF THE INVENTION

1. Field of the Invention

The present invention relates to an image processing method and an image processing apparatus for carrying out image processing on image data that have already been subjected to image processing carried out by a digital camera or the like and added with image processing information regarding the image processing by the digital camera or the like. The present invention also relates to a program embodied on a computer-readable recording medium to cause a computer to execute the image processing method.

2. Description of the Related Art

In a digital still camera (hereinafter referred to as a digital camera), an image obtained by photography can be recorded as digital image data in a recording medium such as an internal memory or an IC card, and can be reproduced by a printer or a monitor based on the digital image data. In the case where an image obtained by a digital camera is reproduced, the image is expected to have as high a quality as a print generated from a negative film.

When a print is generated in the above manner, the quality of the print can be improved by carrying out thereon image processing such as density conversion processing, white balance processing, gradation conversion processing, saturation enhancement processing, and sharpness processing. Therefore, a method has been proposed (U.S. Pat. No. 6,011,547), in order to obtain high-quality printed matter. In this method, photography information such as information on use of flash and the type of lighting is added to image data obtained by a digital camera, and more appropriate image processing can be carried out on the image data with reference to the photography information added to the image data.

Meanwhile, a digital camera has also been proposed that enables output of photographed image data having been subjected to automatic or manual image processing. In such a digital camera having an image processing function, image processing is carried out so as to attain an optimal image quality according to a photographed scene and a photography condition. Furthermore, a photographer can select the type of image processing to be carried out on the image data and various functions related to the image processing according to his/her intention. For example, automatic white balance processing, white balance processing in a fixed light source mode, processing for image quality modification (regarding tones, sharpness, and chroma) and a preference regarding reproduced image (such as preference for a monochrome image, a sepia-color image, and a beautiful skin color) can be selected as the type of image processing. As the various kinds of functions regarding image processing are included selection of a photography mode (such as portrait mode, scenery/distant view mode, macro/close-up mode, night view/fireworks mode, underwater photography mode, and user exposure correction mode), an automatic bracket function, photography using an optical filter, soft focus photography, interval photography, serial photography, multiple exposure, superposition with a template, and superposition with a frame. Optimal image processing can be carried out, reflecting an intention of the photographer according to the selected type of image processing and function.

In the case where image data obtained by such a digital camera having an image processing function are reproduced by a reproduction apparatus such as a printer or a monitor, further image processing is carried out on the image data. However, if the image processing is further carried out on the image data that have already been subjected to the image processing by the digital camera, a reproduced image may not have the quality intended for by the digital camera or the reproduction apparatus.

Meanwhile, automatic white balance processing by a digital camera refers to processing that causes white balance of an image photographed in artificial lighting to look like white balance of an image photographed in daylight. More specifically, the automatic white balance processing is to correct image data so as to cause an average of the image data (that may exclude high saturation pixels) to become a gray value having an intended color temperature (such as color temperature of daylight or tungsten light). For this reason, when automatic white balance processing is carried out, an image photographed in a light source having a low color temperature such as a tungsten light can be reproduced to have more preferable or natural colors. If a sunset is photographed in a fixed daylight mode among fixed light source modes of a digital camera, image data processed by the automatic white balance function enables reproduction of an image reflecting a reddish color of the sunset.

On the other hand, in a reproduction apparatus, white balance processing is carried out for absorbing a characteristic of white balance of a digital camera. Therefore, images obtained from a reproduction apparatus have almost the same white balance, since the reproduction apparatus cannot distinguish between automatic white balance processing set in a digital camera and image processing in a fixed light source mode.

SUMMARY OF THE INVENTION

The present invention has been conceived based on consideration of the above circumstances. An object of the present invention is therefore to carry out image processing on image data in consideration of image processing that has already been carried out by a digital camera or the like having a function of image processing.

An image processing method of the present invention is an image processing method for obtaining processed image data by carrying out image processing on image data added with image processing information regarding image processing that has been carried out on the image data, implemented by:

Setting the content of the image processing to be carried out on the image data based on the image processing information.

The "image processing information on image processing that has been carried out" refers to information representing the content of the image processing that has been carried out on the image data or information from which the content of the image processing that has been carried out on the image data can be inferred. As the information representing the content of image processing is used information representing the type of image processing such as automatic white balance processing, white balance processing according to a light source, gradation conversion processing, density conversion processing, color correction processing, sharpness processing, monochrome processing, and sepia-color processing. The information enabling inference of the content of the image processing refers to information from which how the image processing was carried out can be inferred, although the information does not directly specify the type of the image processing. As such information can be used a photography mode set in a digital camera (such as portrait mode, scenery/distant view mode, macro/close-up mode, night view/fireworks mode, marine photograph mode, and user exposure correction mode), an automatic bracket function, photography using an optical filter, soft focus photography, interval photography, serial photography, multiple exposure, superposition with a template, and superposition with a frame. A flag prohibiting or diminishing further image processing may be used as the image processing information.

The image data have the format defined by JEIDA (Japan Electronic Industry Development Association). The format, Exif (Exchangeable image file format), allows description of various kinds of information in tag information thereof. Therefore, by describing the image processing information in the tag information, the image processing information can be added to the image data.

In the image processing method of the present invention, the content of the image processing to be carried out on the image data may be set based on a result of analysis of the image data, in addition to the image processing information.

The "result of analysis of the image data" refers to the content of the image processing that was carried out on the image data, and can be obtained by judging which type of the image processing was carried out on the image data, based on colors, tones, density, and sharpness of the image data, for example.

The image processing method of the present invention may further comprise the step of:

judging whether or not predetermined image processing is carried out or whether or not the predetermined image processing is to be diminished, based on the image processing information. In this case, the step of setting the content is the step of canceling or diminishing the predetermined image processing in the case where the predetermined image processing is judged to be not carried out or to be diminished.

The "predetermined image processing" refers to a specific type of processing from among a plurality of types of the image processing, if the plurality of types of the image processing is carried out on the image data. The specific type of image processing may represent all the types of the image processing. In the case where only one of the types of the image processing is carried out on the image data, the one type of the image processing refers to the predetermined image processing.

"Canceling the predetermined image processing" refers to not carrying out the predetermined image processing.

In the image processing method of the present invention, it is preferable for the image processing information to be output together with the processed image data.

An image processing apparatus of the present invention comprises processing means for obtaining processed image data by carrying out image processing on image data added with image processing information regarding image processing that has already been carried out on the image data. In the image processing apparatus of the present invention, the processing means sets the content of the image processing to be carried out on the image data, based on the image processing information.

In the image processing apparatus of the present invention, the processing means may set the content of the image processing based on a result of analysis of the image data in addition to the image processing information.

The image processing apparatus of the present invention may further comprise:

judgment means for judging whether or not predetermined image processing is carried out or whether or not the predetermined image processing is to be diminished, based on the image processing information. The judgment means may cancel or diminish the predetermined image processing, in the case where the predetermined image processing is judged to be not carried out or to be diminished.

The image processing apparatus of the present invention may further comprise output means for outputting the image processing information together with the processed image data.

The image processing method of the present invention may be provided as a program that causes a computer to execute the image processing method.

According to the present invention, the content of the image processing to be carried out on the image data is set based on the image processing information added to the image data. Therefore, the content of the image processing to be carried out on the image data can be set so as not to influence the image processing that has already been carried out. Consequently, by carrying out the image processing according to the content that has been set, processed image data reflecting the image processing that has already been carried out can be obtained.

By setting the content of the image processing according to the result of analysis of the image data, the content of the image processing that has been carried out can be known with certainty. Therefore, the processed image data can securely reflect the image processing that has already been carried out on the image data.

DESCRIPTION OF THE PREFERRED EMBODIMENTS

Figure 1:
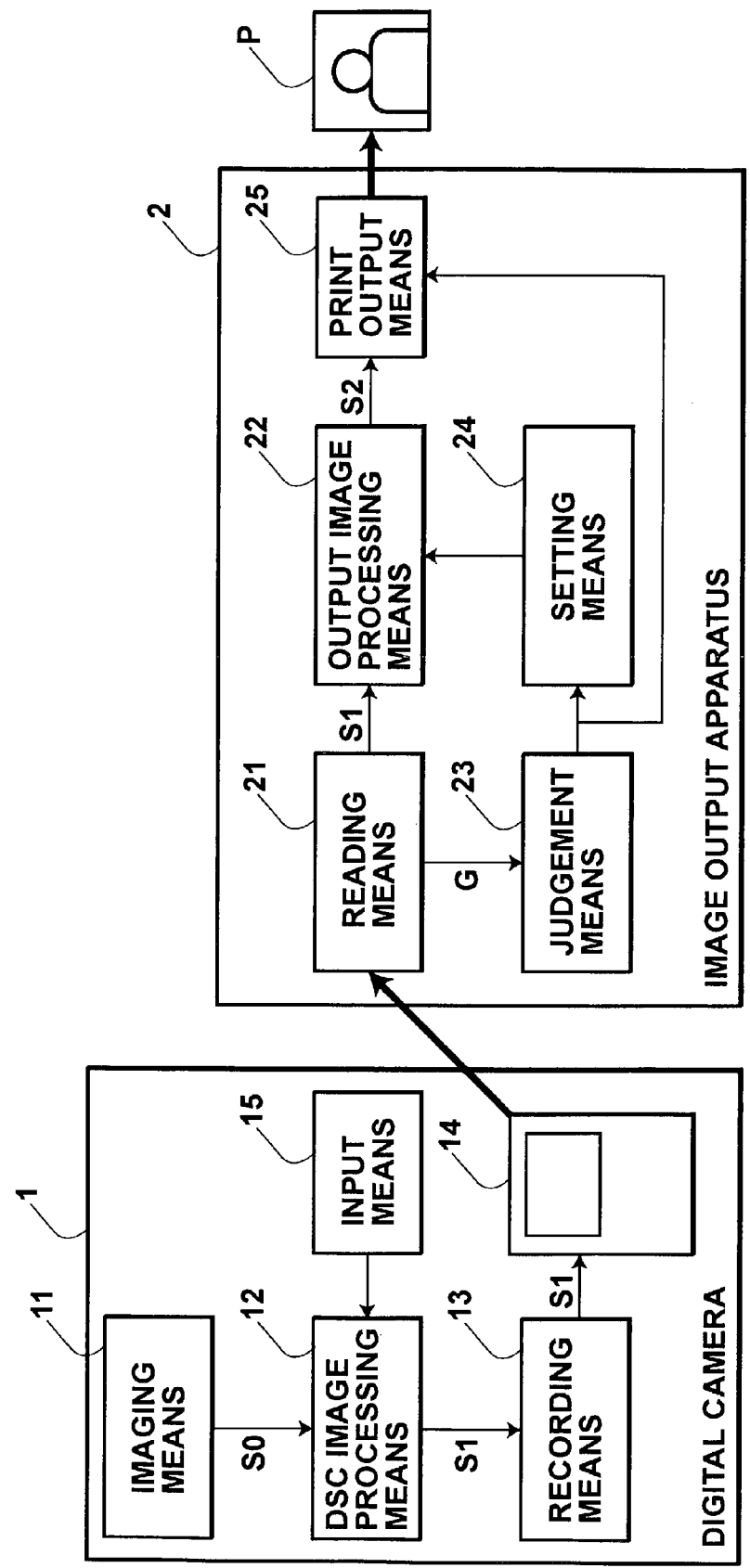
FIG. 1 is a block diagram showing a configuration of an image output system adopting an image output apparatus of a first embodiment of the present invention.

Hereinafter, embodiments of the present invention will be explained with reference to the accompanying drawings. FIG. 1 is a block diagram showing a configuration of an image output system adopting an image output apparatus of a first embodiment of the present invention. As shown in FIG. 1, the image output system in the first embodiment comprises a digital camera 1 and an image output apparatus 2. The image output apparatus 2 outputs as a print or prints P (hereinafter referred to as the prints P) an image data set or image data sets S1 (hereinafter referred to as the image data sets S1) obtained by the digital camera 1.

The digital camera 1 comprises imaging means 11 including a lens, a shutter, and CCDs, DSC image processing means 12 for obtaining the image data sets S1 by carrying out image processing on an image data set or image data sets S0 (hereinafter referred to as the image data sets S0) obtained by the imaging means 11, recording means 13 for recording the image data sets S1 in a memory card 14, and input means 15 comprising a selection dial and a setting button for variously setting the DSC image processing means 12.

A photographer can set the type of image processing to be carried out on the image data sets S0 obtained by photography, with use of the input means 15. As the image processing can be listed automatic white balance processing, white balance processing according to a light source, gradation conversion processing, density conversion processing, color correction processing, sharpness processing, monochrome processing, and sepia-color processing. Photography modes such as portrait mode, scenery/distant view mode, macro/close-up mode, night view/fireworks mode, underwater photography mode, and user exposure correction mode are also available. The user exposure correction mode is the mode for a user to manually correct an exposure condition. Other settings such as an automatic bracket function, photography with an optical filter, soft focus photography, interval photography, serial photography, multiple exposure, superposition with a template, and superposition with a frame can also be used.

The DSC image processing means 12 obtains the image data sets S1 by carrying out the image processing on the image data sets S0 according to the type of the image processing set by the photographer. In the case where one of the photography modes has been set, the DSC image processing means carries out the image processing on the image data sets S0 according to the photography mode that has been set, and obtains the image data sets S1. The image data sets S1 are of Exif format, and image processing information G representing the type of image processing that has been carried out on the image data sets S1, the photography mode, and the like is described in tag information added to each of the image data sets S1.

The recording means 13 records the image data sets S1 added with the image processing information G in the memory card 14.

In the digital camera 1 having the above components, the image data sets S0 are obtained by photography with the imaging means 11, and the DSC image processing means 12 carries out the image processing on the image data sets S1 according to the type of the image processing or the photography mode input from the input means 15. In this manner, the image data sets S1 are obtained, and the image processing information G describing the type of the image processing and the photography mode is added to the image data sets S1. The recording means 13 records the image data sets S1 added with the image processing information G in the memory card 14.

The image output apparatus 2 comprises reading means 21 such as a card slot for reading the image data sets S1 from the memory card 14, output image processing means 22 for obtaining a processed image data set or processed image data sets S2 (hereinafter referred to as the processed image data sets S2) by carrying out image processing on the image data sets S1, judgment means 23 for judging the type of the image processing that has been carried out on the image data sets S1 from the image processing information G, setting means 24 for setting the content of image processing to be carried out on the image data sets S1 by the output image processing means 22 according to the type of the image processing judged by the judgment means 23, and print output means 25 for outputting the processed image data sets S2 as the prints P.

Figure 2:
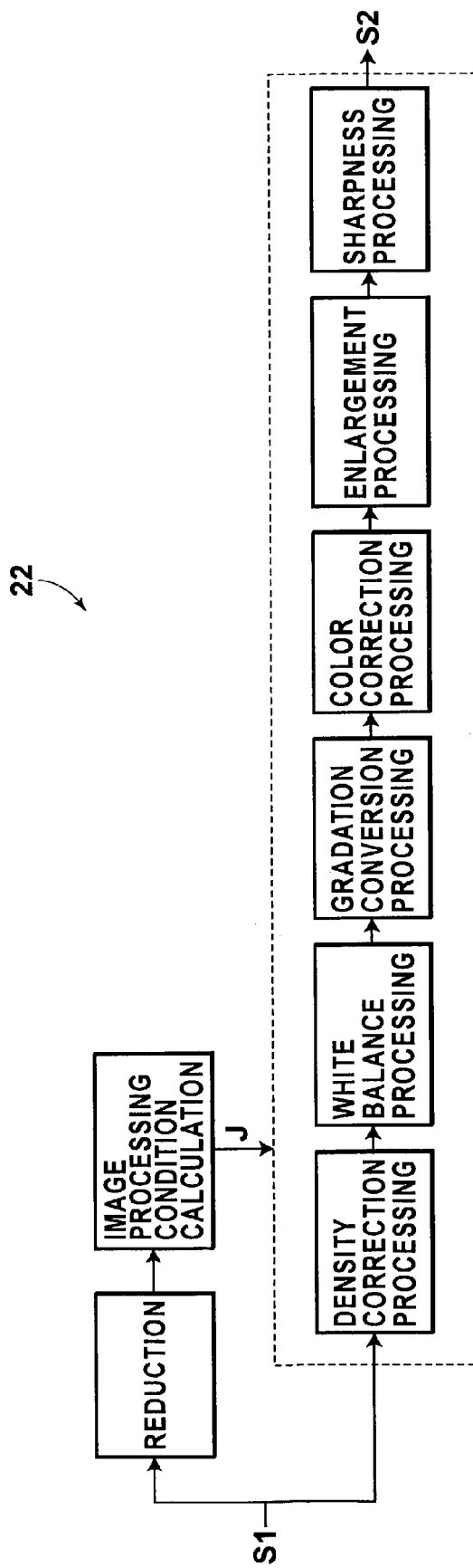
FIG. 2 is a block diagram showing procedures carried out by output image processing means.

FIG. 2 is a block diagram showing procedures carried out in the output image processing means 22. As shown in FIG. 2, the output image processing means 22 reduces the image data sets S1, calculates an image processing condition J based on the reduced image data sets, and carries out density correction processing, white balance processing, gradation conversion processing (that is, tone processing), color correction processing, enlargement processing for adjusting an image size, and sharpness processing, according to the image processing condition J. In this manner, processed image data sets S2 are obtained. The content of the processing carried out by the output image processing means 22 is set by the setting means 24.

Figure 3:
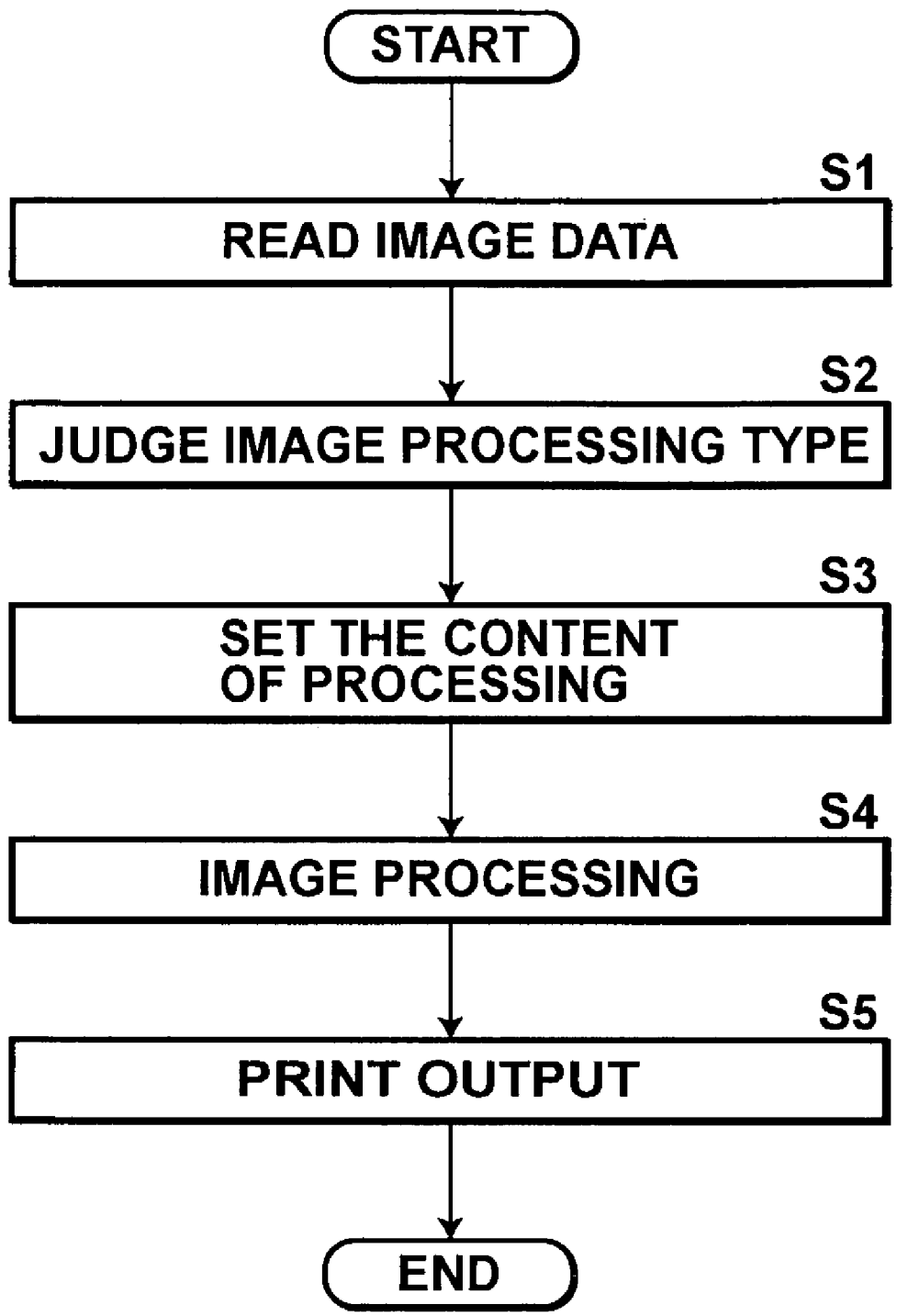
FIG. 3 is a flow chart showing the operation in the first embodiment.

The operation of the image output apparatus 2 will be explained next. FIG. 3 is a flow chart showing the operation of the image output apparatus 2. The reading means 21 reads the image data sets S1 from the memory card 14 (Step S1), and the image processing information G added to the image data sets S1 is input to the judgment means 23. The type of the image processing that has been carried out on the image data sets S1 is then judged by the judgment means 23 according to the image processing information G (Step S2). The setting means 24 sets the content of the image processing to be carried out on the image data sets S1, based on the type of the image processing (Step S3).

Hereinafter, how to set the content of the image processing according to the type of the past image processing will be explained in detail. In the case where the image processing information G includes information on automatic white balance processing and white balance processing for the case of a fixed light source such as daylight or tungsten light, white balance processing by the output image processing means 22 is set to be cancelled or diminished.

In the case where the image processing information G does not include the information on the white balance processing, automatic white balance processing is set to be carried out. For example, an average of pixel values excluding high-saturation pixels is calculated from an image represented by any one of the image data sets S1, and a conversion table for conversion of the average into a predetermined reference value is generated for conversion of the image data sets S1. In this case, the conversion table is preferably generated based on more than one of the image data sets S1.

In the case where the image processing information G includes information on gradation conversion processing, gradation conversion processing is not carried out by the output image processing means 22. Alternatively, the gradation conversion processing may be carried out according to a standard gradation conversion curve for image output in standard tones.

Meanwhile, in the case where the image processing information G does not include the information on gradation conversion processing, the gradation conversion processing is carried out by the output image processing means 22 in accordance with a dynamic range of the image data sets S1. For example, for the image data sets S1 whose dynamic range is wide, tones are softened by decreasing data values in an intermediate density range and in a shadow range. In this manner, colors in the shadow range are prevented from being flattened. On the contrary, for the image data sets S1 whose dynamic range is small, the image data sets as a whole and/or in a highlight range are increased to have hard tones.

In the case where the image processing information G includes information on saturation enhancement processing, saturation enhancement processing by the output image processing means 22 is cancelled. Since chroma is enhanced by hard tones, gradation conversion processing to harden tones is cancelled or diminished.

In the case where the image processing information G includes information on sharpness processing, the sharpness processing by the output image processing means 22 is cancelled or diminished. In some cases, a degree of sharpness is changed in accordance with a characteristic of the print output means 25 or a condition to view a reproduced image. Therefore, such sharpness processing for compensating the sharpness change is carried out even if the image processing information G represents the fact that the sharpness processing has already been carried out in the digital camera 1.

In the case where the image processing information G includes information on a photography mode, the type of image processing carried out in the photography mode is inferred, and the inferred image processing is cancelled or diminished. For example, if the image processing information G includes information on scenery/distant view mode, the image data sets S1 have already been subjected to processing for softening tones in a low frequency range, gradation conversion processing, sharpness processing, and saturation enhancement processing. Therefore, the processing of these types is cancelled or diminished.

In some cases, automatic bracket photography is carried out by using the digital camera 1. Automatic bracket photography is to photograph a plurality of images representing the same subject while changing an image processing condition in a plurality of steps for image processing regarding exposure, chroma, contrast, or sharpness. In this case, the image processing information G describes for which item (that is, for exposure, chroma, contrast, or sharpness) the bracket photography has been carried out. By carrying out such automatic bracket photography, the plurality of images of various exposure, chroma, contrast, or sharpness can be obtained, and one of the images having desired exposure, chroma, contrast, or sharpness can be selected therefrom. In this case, in order to reflect in the image data sets S1 the change of the image processing condition in the automatic bracket photography carried out by the digital camera 1, image processing by the output image processing means 22 is not carried out on the image data sets S1 obtained by the automatic bracket photography. Alternatively, for the items of image processing other than the item of image processing whose image processing condition was changed in the automatic bracket photography, the output image processing means 22 carries out the image processing by using the same image processing conditions.

If the image processing by the image output apparatus 2 is carried out on the image data sets S1 obtained by automatic bracket photography, the change in exposure, chroma, contrast, or sharpness in the automatic bracket photography cannot be reflected in the processed image data sets S2. Therefore, in the case where the image processing information G includes information on the automatic bracket photography, the setting means 24 cancels the image processing by the output image processing means 22 or sets the image processing to be carried out according to a predetermined image processing condition for the item of image processing whose image processing condition was changed in the automatic bracket photography. More preferably, for the items of image processing other than the item of image processing whose image processing condition was changed in the automatic bracket photography, the setting means sets the output image processing means 22 to carry out the image processing by using the same image processing conditions on all the image data sets S1. In this manner, the processed image data sets S2 reflecting the effect of automatic bracket photography can be obtained.

In the case where the image processing information G includes information on monochrome processing or sepia-color processing, the white balance processing is set to be not carried out or to be diminished.

In the case where the image processing information G includes information on soft focus photography, sharpness processing is set to be not carried out or to be diminished.

In the case where the image processing information G includes information on interval photography, an average of an image processing parameter found from each of the image data sets S1 is used in the image processing by the output image processing means 22, in order to carry out the same image processing on all the image data sets S1 obtained by the interval photography. Alternatively, the image processing is set to be carried out according to the same image processing parameter as the image processing parameter used for the image data set S1 that is subjected to the image processing first among all the image data sets S1.

In the case where the image processing information G includes information on superposition with a template, density conversion processing, white balance processing, gradation conversion processing, and color correction processing are set to be cancelled or to be diminished so as not to change colors and density of the template.

As shown in Table 1 below, the content of image processing on the image data sets S1 may be set according to the type of the image processing or the photography mode represented by the image processing information G. In Table 1, a circle represents cancellation or diminishing of the corresponding image processing. An X refers to usage of the predetermined condition or usage of the same image processing condition on the image data sets obtained by serial photography, multiple exposure, and super position with a frame.

TABLE 1

| Image Processing Information | Color Processing | Chroma/Hue Processing | Density Conversion Processing | Gradation Conversion Processing | Sharpness Processing |
|---|---|---|---|---|---|
| Fixed Light Source Mode | ○ | ○ | | | |
| Gradation conversion Processing | | | | ○ | |
| Sharpness Processing | | | | | ○ |
| Saturation enhancement Processing | | ○ | | ○ | |
| Portrait Mode | | ○ | | ○ | ○ |
| Scenery/Distant view Mode | | | | ○ | ○ |

TABLE 1-continued

| Image Processing Information | Color Processing | Chroma/Hue Processing | Density Conversion Processing | Gradation Conversion Processing | Sharpness Processing |
|---|---|---|---|---|---|
| Macro/Close-up Mode | | | | | ○ |
| Night View/Fireworks Mode | | | ○ | ○ | |
| Underwater Photography Mode | ○ | | | ○ | |
| User Exposure Correction | | | ○ | | |
| *Automatic Bracket Photography | | ○ | ○ | ○ | ○ |
| Serial Photography | | | X | | ○ |
| Multiple Exposure | | | X | | |
| Superposition with Frame | | | X | | |

*Select a circle, depending on the content of automatic bracket photography

After the content of the image processing by the output image processing means has been set in the above manner, the output image processing means 22 carries out the image processing on the image data sets S1, and the processed image data sets S2 are obtained (Step S4). The processed image data sets S2 are printed by the print output means 25 as the prints P (Step S5) to end the procedures.

It is preferable for the image processing information G to be printed on the backside of each of the prints P. In this case, the image processing information G may be printed as characters or as illustrations that can specify the content thereof.

As has been described above, in the first embodiment, the content of the image processing to be carried out on the image data sets S1 is set according to the image processing information G added to the image data sets S1. Therefore, the content of the image processing on the image data sets S1 can be set so as not to influence the image processing that has already been carried out on the image data sets S1. Consequently, by carrying out the image processing on the image data sets S1 according to the content that has been set, the processed image data sets S2 can reflect the image processing that has already been carried out on the image data sets S1.

By printing the image processing information G on the backside of the prints P, the photographer can easily recognize the image processing carried out on the image data sets S1 by the digital camera 1.

In the above embodiment, the processed image data sets S2 may be displayed on a monitor. In this case, the image processing information G is displayed at the side of an image reproduced on the monitor.

Figure 4:
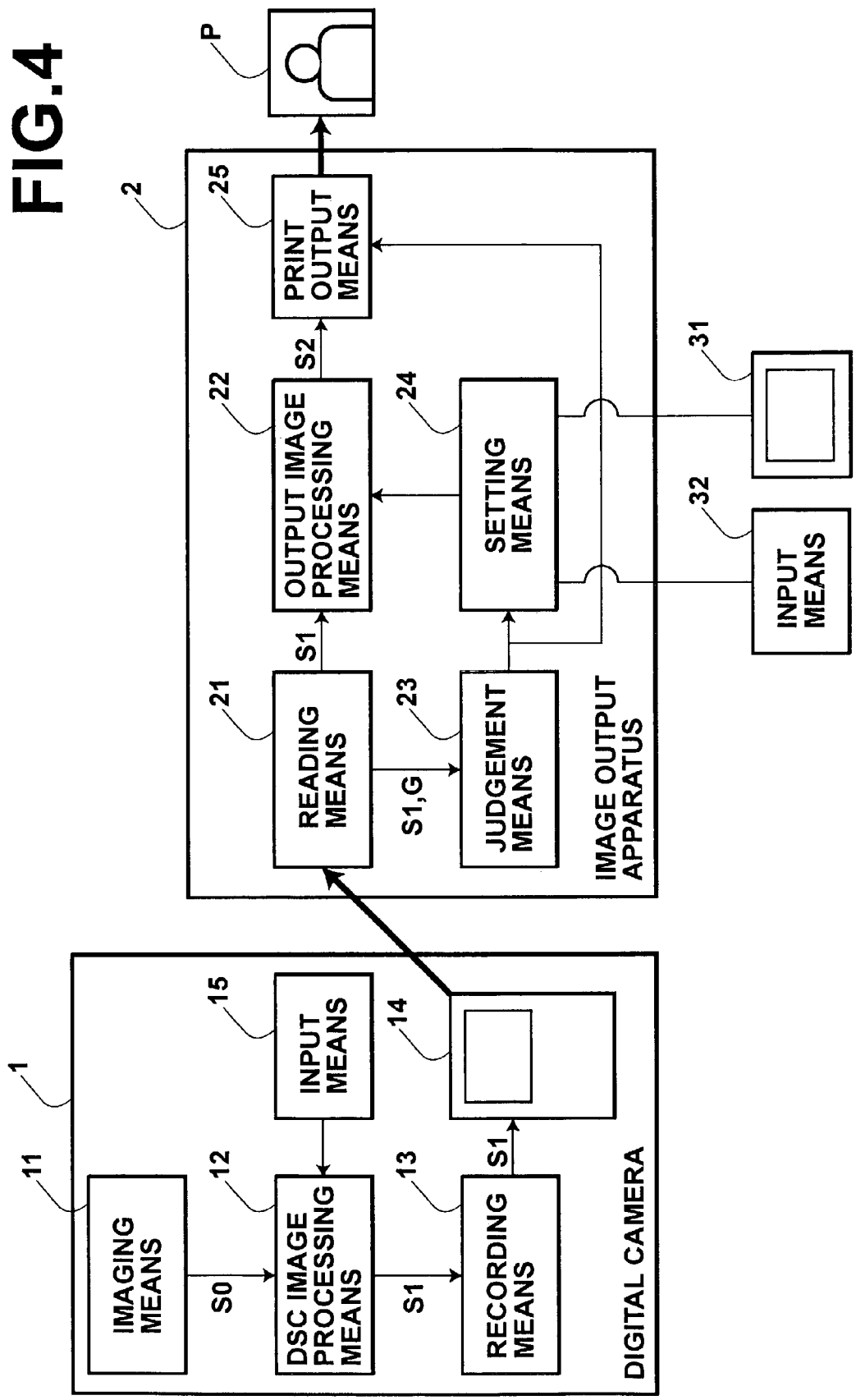
FIG. 4 is a block diagram showing a configuration of an image output system adopting an image output apparatus of a second embodiment of the present invention.

A second embodiment of the present invention will be explained next. FIG. 4 is a block diagram showing a configuration of an image output system adopting an image output apparatus of the second embodiment of the present invention. In the second embodiment, the same components as in the first embodiment have the same reference numbers, and detailed explanations thereof will be omitted. Differences between the first embodiment and the second embodiment are as follows. Firstly, in the second embodiment, a monitor 31 for displaying processed image data sets S2 as well as various kinds of information is further used together with input means 32 comprising a keyboard and a mouse for inputting the various kinds of information. In the second embodiment, judgment means 23 judges whether or not image processing information G includes a flag preventing or diminishing image processing on image data sets S1. In the case where the flag is included, the image processing by output image processing means 22 is cancelled or diminished. At the time setting means 24 sets a degree of the image processing in the second embodiment, the degree can be adjusted by a manual input from the input means 32. Furthermore, the judgment means 23 judges the content of image processing that has been carried out on the image data sets S1 by analyzing the image data sets S1.

The flag is included in the image processing information G by a photographer using a digital camera 1. The flag is included in the image processing information G together with information on the type of image processing and a photography mode, when the image processing is carried out on the image data sets S0 by the digital camera 1.

In the second embodiment, the image processing information G includes the flag in addition to the information on the type of the image processing and the photography mode in the digital camera 1. However, depending on a model of the digital camera 1, the image processing information G includes only the flag, and the type of the image processing and the photography mode may not be included therein. For example, in the case where monochrome processing, sepia-color processing, photography using an optical filter, or superposition with a template is carried out, the type of image processing and the photography mode are not included in the image processing information G. Other types of image processing and photography mode may be included in the image processing information G.

For this reason, in the second embodiment, the judgment means 23 judges the content of the image processing that has been carried out on the image data sets S1 through analysis of the image data sets S1, in the case where the image processing information G includes the flag but the content thereof is not known.

Figure 5:
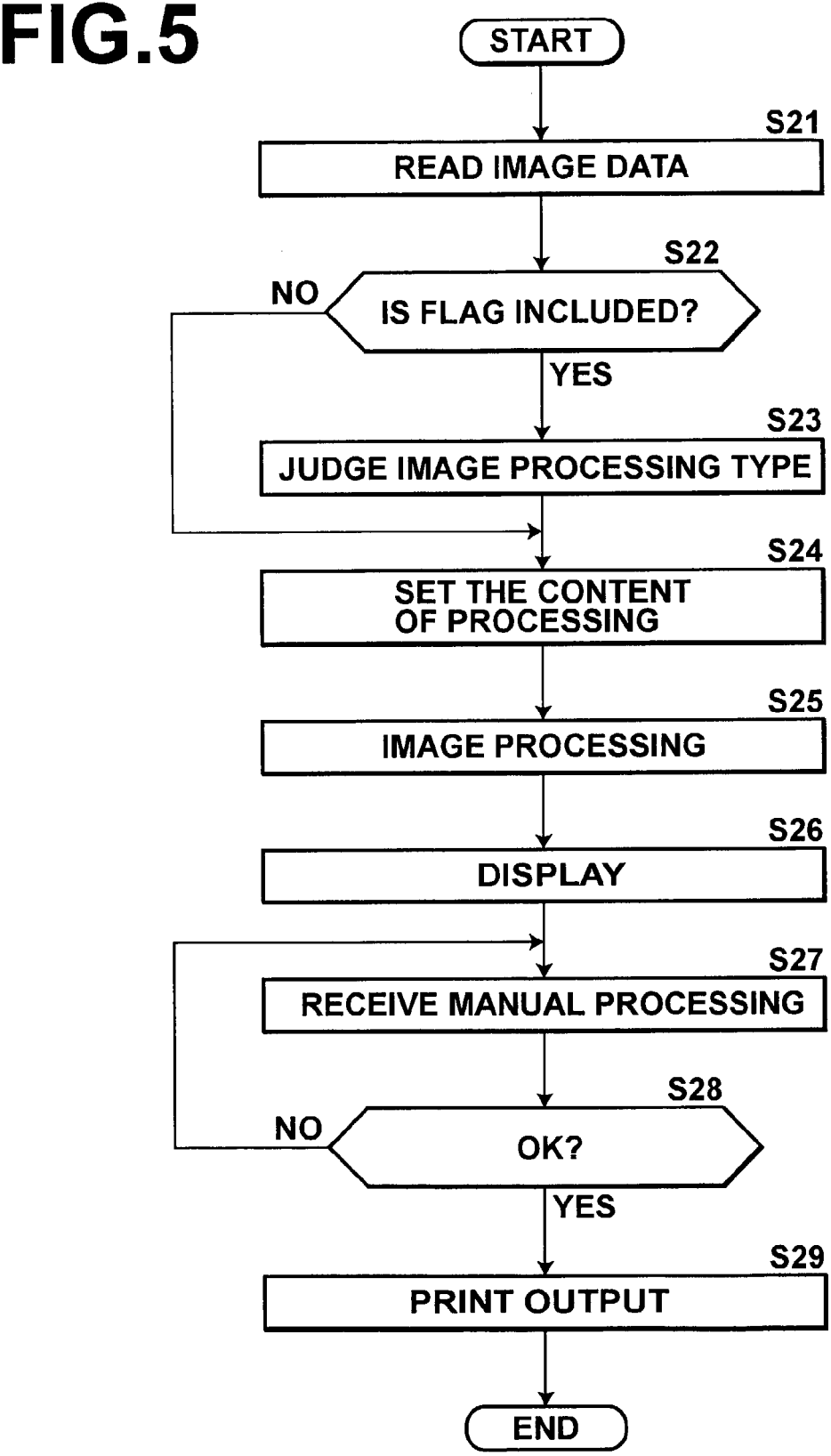
FIG. 5 is a flow chart showing the operation in the second embodiment.

The operation of the second embodiment will be explained next. FIG. 5 is a flow chart showing the operation in the second embodiment. Reading means 21 reads the image data sets S1 from a memory card 14 (Step S21). The image processing information G added to the image data sets S1 is input to the judgment means 23, and the judgment means 23 judges whether or not the flag preventing or diminishing the image processing on the image data sets S1 is included in the image processing information G (Step S22). In the case where a result at Step S22 is affirmative, the judgment means 23 further judges the type of image processing that has already been carried out on the image data sets S1, based on the image processing information G (Step S23). In this case, the type of image processing can also be judged by analyzing the image data sets S1.

For example, in the case where the digital camera 1 does not include in the image processing in formation G the content of monochrome processing carried out on the image data sets S1, the flag is included in the image processing information G but the content thereof is not included. For this reason, the judgment means 23 judges the number of channels of the image data sets S1. In the case where the image data sets S1 represent images having 1 channel, the image data sets S1 are judged to have been subjected to monochrome processing. In the case where the number of channels is 3 but averages of RGB values are the same for entire images, the image data sets are also judged to have been subjected to monochrome processing.

In the case where the digital camera 1 does not include the content of sepia-color processing carried out on the image data sets S1 in the image processing information G, only the flag representing the sepia-color processing is included in the image processing information G but the content thereof is not included. For this reason, the judgment means 23 divides each of the images represented by the image data sets S1 into areas. In the case where the averages of RGB values are approximately the same in each of the areas, the image data sets S1 are judged to have been subjected to sepia-color processing.

In the case where the image processing information G does not include the type of the image processing and the photography mode, the judgment means 23 judges the content of the image processing on the image data sets S1 by using various methods, such as the number of channels, the averages of RGB values, and the averages in the divided areas described above.

Once the type of the image processing has been judged by the judgment means 23 as has been described above, the setting means 24 sets the content of the image processing to be carried out on the image data sets S1 according to the type of the image processing that has been carried out, as in the first embodiment (Step S24). In the case where the result at Step S22 is negative, the content of the image processing to be carried out on the image data sets S1 is set at Step S24 based on the image data sets S1.

After the content of the image processing has been determined in the above manner, the output image processing means 22 carries out the image processing on the image data sets S1 to generate the processed image data sets S2 (Step S25). The processed image data sets S2 are displayed on the monitor 31 (Step S26), and manual processing by an operator using the input means 32 is received (Step S27).

Figure 6:
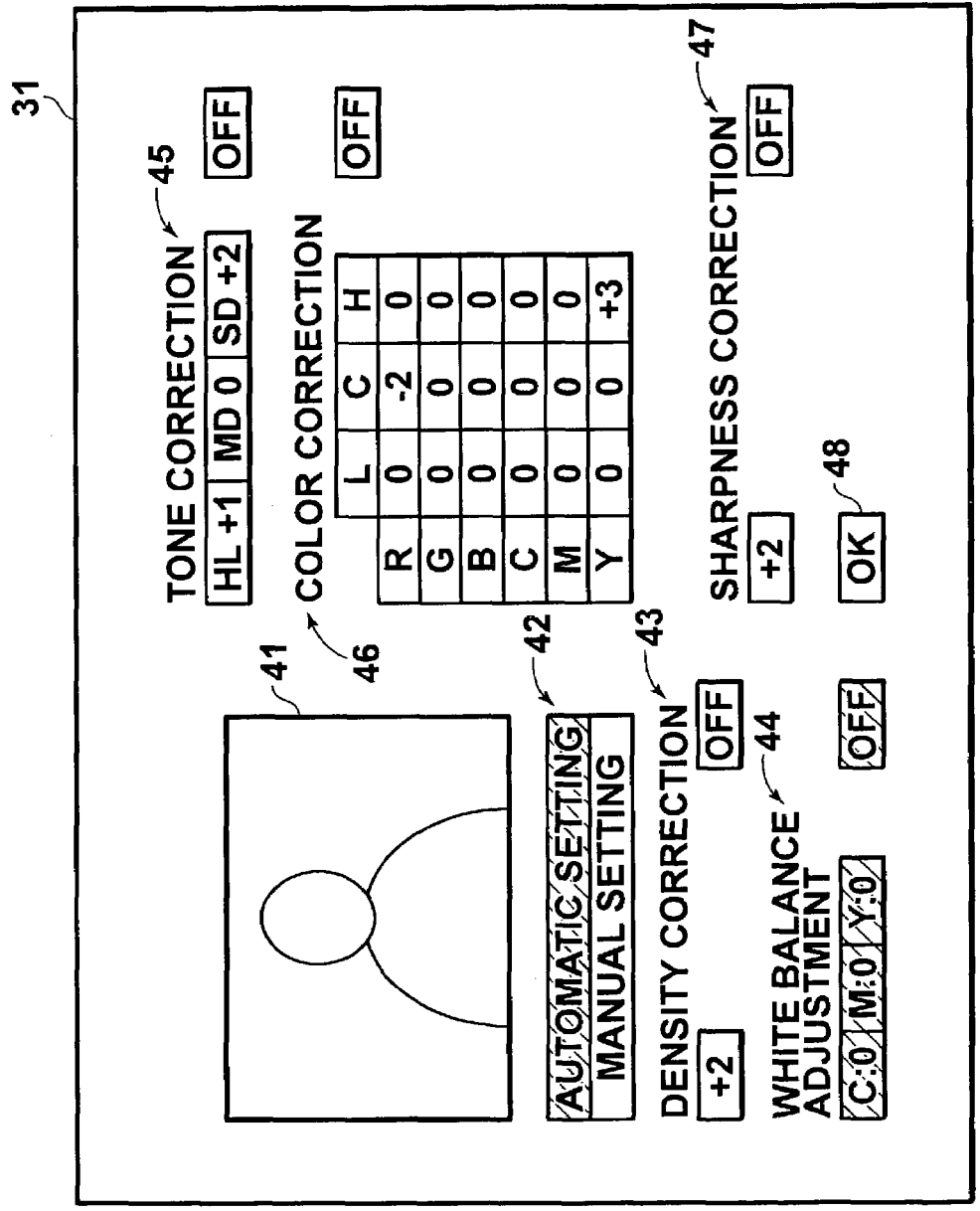
FIG. 6 shows a manual processing input window (part 1)
Figure 7:
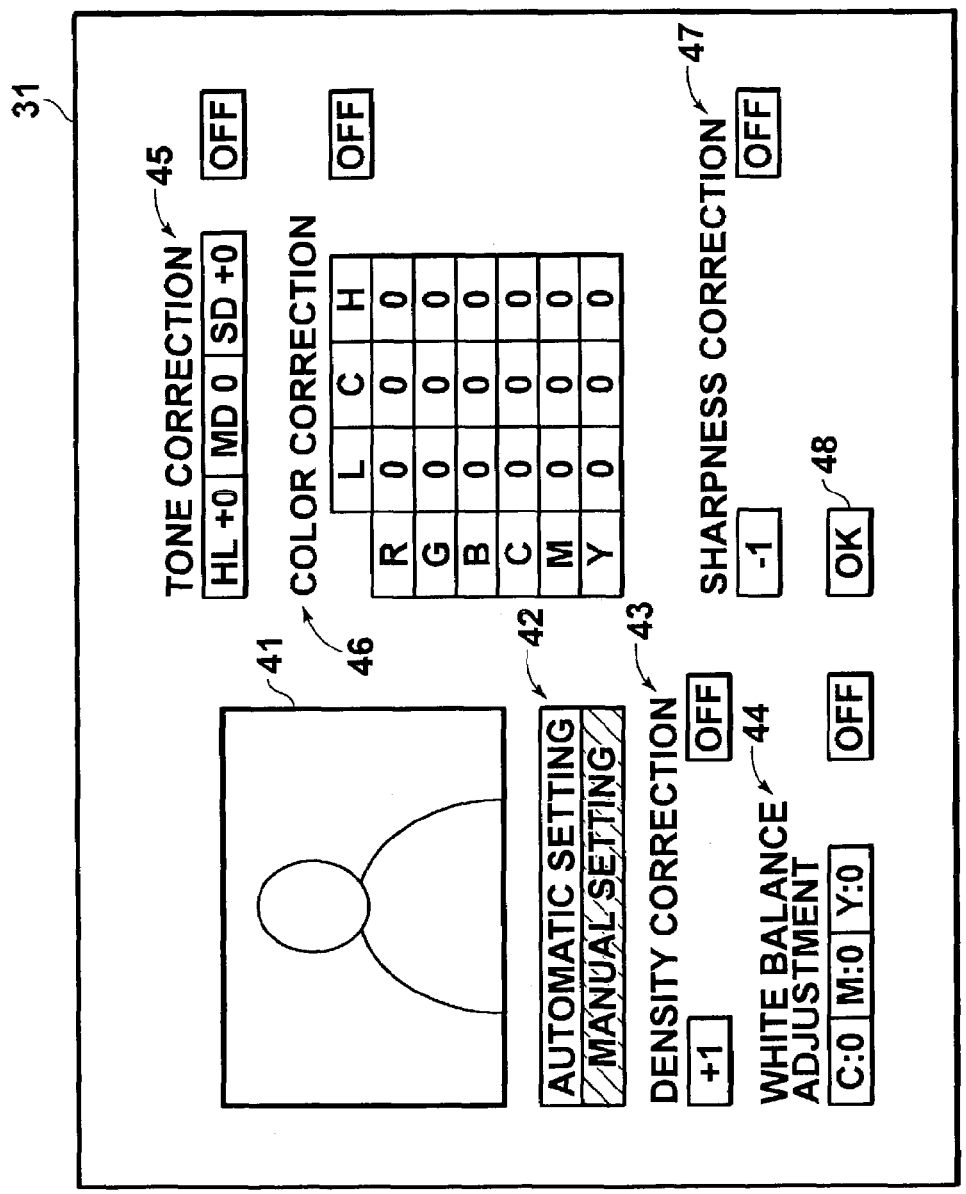
FIG. 7 shows the manual processing input window (part 2).

FIG. 6 shows a manual processing input window displayed on the monitor 31. As shown in FIG. 6, in the manual processing input window are displayed a processed image 41 represented by one of the processed image data sets S2, setting switch buttons 42 for switching from automatic setting to manual setting and vice versa for the image processing, a density correction button 43 for correcting density, white balance adjustment buttons 44 for adjusting white balance, tone correction buttons 45 for correcting tones, color correction buttons 46 for correcting colors, a sharpness correction button 47 for correcting sharpness, and an OK button 48 for confirming the image processing. OFF buttons are also included in the density correction button 43, the white balance adjustment buttons 44, the tone correction buttons 45, the color correction buttons 46, and the sharpness correction button 47, for cancellation of the corresponding image processing.

The tone correction buttons 45 include an HL button, an MD button, and an SD button representing a highlight range, an intermediate density range and a shadow range, respectively. The color correction buttons 46 include an L button, a C button, and an H button representing lightness, chroma, and hue, respectively.

In the second embodiment, the output image processing means 22 automatically carries out the image processing to generate the processed image data sets S2. Therefore, as shown in FIG. 6, a color of an "automatic setting" button in the setting switch buttons 42 in the manual processing input window is changed so as to easily show that the automatic setting has been carried out. The color change is shown as a hatched area in FIG. 6. Furthermore, in the case where white balance processing has not been carried out for example, the OFF button for the white balance adjustment button 44 is turned on so as to easily show that the white balance adjustment has not been carried out. In addition, a color of the white balance adjustment buttons 44 is also changed.

An operator judges whether or not the image processing is to be further carried out on the processed image data sets in the manual processing input window. In the case where the manual processing is necessary, the operator clicks a "manual setting" button in the setting switch buttons 42. In this manner, all the buttons in the window becomes usable, and the operator carries out manual processing for a desired image quality by adjusting the degree of the image processing with the buttons.

Whether or not the OK button 48 has been clicked is then judged (Step S28). The input for manual processing is received until a result at Step S28 becomes affirmative. When the result at Step S28 becomes affirmative, the processed image data sets S2 are output as prints P by print output means 25 (Step S29) to end the operation.

As has been described above, in the second embodiment, the content of the image processing to be carried out on the image data sets S1 can be set according to the image processing information G added to the image data sets S1. Therefore, the content can be set so as not to influence the image processing that has already been carried out on the image data sets S1. Furthermore, by carrying out the image processing according to the manual input, the image processing can be carried out on the image data sets S1 as the operator wishes, and the processed image data sets S2 can reflect a preference of the operator as well as the image processing that has already been carried out on the image data sets S1.

In the first and second embodiments described above, the image output apparatus 2 carries out the image processing on the image data sets S1 that have already been subjected to the image processing by the digital camera 1. In the case where the image data sets S1 have been subjected to image processing by a personal computer or the like and added with the image processing information G representing the content of the image processing, the content of the image processing to be carried out on the image data sets S1 may be set according to the image processing information G, as in the first and second embodiments described above.

In the first and second embodiments described above, the digital camera 1 includes the photography mode in the image processing information G. However, the type of image processing carried out on the image data sets S0 according to the photography mode may be included in the image processing information G, instead of the photography mode.

What is claimed is:

1. An image processing method, comprising the steps of:
receiving previously-processed image data and first image processing information representative of first image processing that was previously carried out on original image data to produce said previously-processed image data, wherein said first image processing information is information from which content of the first image processing that was previously carried out on the original image data can be inferred;
inferring the content of the first image processing based on the first image processing information; and
determining the content of second image processing to be carried out on the previously-processed image data, based on the content of the first image processing inferred from the first image processing information,
wherein the first image processing information comprises information regarding a photography mode set in a digital camera, and wherein the content of the second image processing accounts for the photography mode while retaining the content of the first image processing, and
wherein the step of determining the content of the second image processing to be carried out comprises:
judging whether or not a predetermined content of the second image processing is to be carried out or whether or not the predetermined content of the second image processing is to be diminished, based on the first image processing information; and
canceling or diminishing the predetermined content of the second image processing in the case where the predetermined content of the second image processing is judged to be not carried out or to be diminished, respectively.

2. An image processing method as defined in claim 1, wherein the step of determining the content of the second image processing to be carried out on the previously-processed image data is the step of determining the content based on a result of analysis of the previously-processed image data in addition to the first image processing information.

3. An image processing method as defined in any of claims 1 and 2, further comprising the step of:
processing the previously-processed image data according to the content of the second image processing to be carried out, to produce processed image data.

4. An image processing method as defined in claim 3, further comprising the step of outputting the image processing information together with the processed image data.

5. An image processing method as defined in claim 1, wherein the content of the second image processing to be carried out is determined in the determining step so as to not influence the first image processing that has already been carried out.

6. An image processing method as defined in claim 1, wherein the first image processing that has been carried out or the second image processing to be carried out corresponds to image processing that influences an appearance of the image.

7. An image processing method as defined in claim 6, wherein the first image processing that has been carried out or the second image processing to be carried includes at least one of white balance processing, gradation conversion processing, density conversion processing, color correction processing, sharpness processing, monochrome processing, sepia-color processing, and photography mode processing.

8. The image processing method as defined in claim 1, wherein the first image processing was carried out on the original image data by the digital camera in accordance with the photography mode, to produce the previously-processed image data.

9. An image processing apparatus comprising:
receiving means for receiving previously-processed image data and first image processing information representative of first image processing that was previously carried out on original image data to produce said previously-processed image data, wherein said first image processing information is information from which content of the first image processing that was previously carried out on the original image data can be inferred;
inferring means for inferring the content of the first image processing based image processing information; and
determining means for determining the content of second image processing to be carried out on the previously-processed image data, based on the content of the first image processing inferred from the first image processing information,
wherein the first image processing information comprises information regarding a photography mode set in a digital camera, and wherein the content of the second image processing accounts for the photography mode while retaining the content of the first image processing, and
wherein the determining means further comprises:
judgment means for judging whether or not a predetermined content of the second image processing is to be carried out or whether or not the predetermined content of the second image processing is to be diminished, based on the first image processing information, and
wherein the judgment means cancels or diminishes the predetermined content of the second image processing, in the case where the predetermined content of the second image processing is judged to be not carried out or to be diminished, respectively.

10. An image processing apparatus as defined in claim 9, wherein the determining means determines the content of the second image processing based on a result of analysis of the previously-processed image data in addition to the first image processing information.

11. An image processing apparatus as defined in any of claims 9 and 10, further comprising:
processing means for processing the previously-processed image data according to the content of the second image processing to be carried out, to produce processed image data.

12. An image processing apparatus as defined in claim 11, further comprising output means for outputting the image processing information together with the processed image data.

13. An image processing apparatus as defined in claim 9, wherein the determining means determines the content of the second image processing to be carried out so as to not influence the first image processing that has already been carried out.

14. An image processing apparatus as defined in claim 9, wherein the first image processing that has been carried out or the second image processing to be carried out corresponds to image processing that influences an appearance of the image.

15. The image processing apparatus as defined in claim 9, wherein the first image processing was carried out on the original image data by the digital camera in accordance with the photography mode, to produce the previously-processed image data.

16. A computer-readable medium on which a program is recorded, the program causing a computer to execute an image processing method comprising the steps of:
receiving previously-processed image data and first image processing information representative of first image processing that was previously carried out on original image data to produce said previously-processed image data, wherein said first image processing information is information from which content of the first image processing that was previously carried out on the original image data can be inferred;

inferring means for inferring the content of the first image processing based on the first image processing information; and determining the content of second image processing to be carried out on the previously-processed image data, based on the content of the first image processing inferred from the first image processing information, wherein the first image processing information comprises information regarding a photography mode set in a digital camera, and wherein the content of the second image processing accounts for the photography mode while retaining the content of the first image processing, and wherein the step of determining the content of the second image processing to be carried out comprises:

judging whether or not a predetermined content of the second image processing is to be carried out or whether or not the predetermined content of the second image processing is to be diminished, based on the first image processing information; and canceling or diminishing the predetermined content of the second image processing in the case where the predetermined content of the second image processing is judged to be not carried out or to be diminished, respectively.

17. A computer-readable medium as defined in claim 16, wherein the step of determining the content of the second image processing to be carried out on the previously-processed image data is the step of determining the content based on a result of analysis of the previously-processed image data in addition to the first image processing information.

18. A computer-readable medium as defined in any one of claims 16 and 17, said program further comprising the step of:
processing the previously-processed image data according to be content of the second processing to be carried out, to produce processed image data.

19. A computer-readable medium as defined in claim 18, the program further comprising the step of outputting the image processing information together with the processed image data.

20. A computer-readable medium as defined in claim 16, wherein the determining step determines the second image processing to be carried out so as to not influence the first image processing that has already been carried out.

21. A computer-readable medium as defined in claim 16, wherein the first image processing that has been carried out or the second image processing to be carried out corresponds to image processing that influences an appearance of the image.

22. The computer-readable medium as defined in claim 16, wherein the first image processing was carried out on the original image data by the digital camera in accordance with the photography mode, to produce the previously-processed image data.

* * * * *